(12) United States Patent
King et al.

(10) Patent No.: US 6,418,402 B1
(45) Date of Patent: Jul. 9, 2002

(54) METHOD AND SYSTEM FOR UTILIZING MACHINE TRANSLATION AS INPUT CORRECTION

(75) Inventors: Dennis D. King; Richard J. Redpath, both of Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/361,767

(22) Filed: Jul. 27, 1999

(51) Int. Cl.[7] ........................ G06F 17/20; G06F 17/28; G06F 13/00
(52) U.S. Cl. .................. 704/8; 704/3; 709/217
(58) Field of Search ................. 704/1–2, 8; 707/536, 707/5, 3, 4, 10; 709/245, 200, 219, 217, 203

(56) References Cited

U.S. PATENT DOCUMENTS

| | | | | |
|---|---|---|---|---|
| 5,678,045 A | * | 10/1997 | Bettels | 707/10 |
| 5,715,466 A | * | 2/1998 | Flanagan et al. | 704/2 |
| 5,884,246 A | * | 3/1999 | Boucher et al. | 704/2 |
| 5,956,740 A | * | 9/1999 | Nosohara | 707/536 |
| 5,987,508 A | * | 11/1999 | Agraharam et al. | 709/217 |
| 6,006,221 A | * | 12/1999 | Liddy et al. | 707/5 |
| 6,064,951 A | * | 5/2000 | Park et al. | 704/8 |
| 6,154,246 A | * | 11/2000 | Call | 707/4 |
| 6,182,148 B1 | * | 1/2001 | Tout | 709/245 |
| 6,247,048 B1 | * | 6/2001 | Greer et al. | 709/219 |

OTHER PUBLICATIONS

Oard, D. et al., "A Survey Of Multilingual Text Retrieval" Institute for Advanced Computer Studies nad Computer Science Department, Apr. 1996, pp. 1–31.*
Dumains et al., "Automatic Cros–Language Retrieval Using Latent Semantic Indexing" in AAAI Symposium on Cross-–Language Text and Speech Retrieval, 1997.*

* cited by examiner

*Primary Examiner*—Patrick N. Edouard
(74) *Attorney, Agent, or Firm*—Myers Bigel Sibley & Sajovec, PA; A. Bruce Clay

(57) ABSTRACT

A query from a user in a user's language to a directory service in another language different from the user's language is intercepted. The query is translated from the user's language into the language of the directory service. The translated query is then delivered to the directory service and an appropriate response is provided for the user.

24 Claims, 5 Drawing Sheets

400
The URL is received with the Language origin specified. For example German.

410
The URL is modified, by translating the RDNs to the language centric of the LDAP database. For example English. Using a machine translation engine.

420
The Modified URL is used to perform the query

METHOD AND SYSTEM FOR UTILIZING MACHINE TRANSLATION AS INPUT CORRECTION

FIELD OF THE INVENTION

This invention relates in general to computer software, and in particular to a method and system by which application developers can utilize machine translation to seamlessly extend the search indexing of a directory service to be multi-lingual.

BACKGROUND OF THE INVENTION

Internet, also referred to as an "internetwork," is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of on-line public records may reduce operating costs. Of increasing importance is the use of the Internet and commercial transactions. Increasing amounts of commerce occur on the Internet. Entire businesses exist only on the Internet to sell goods and services to consumers. Other businesses are establishing a presence on the Internet to reach new consumers.

Currently, the most commonly employed method of transferring data over the Internet is to employ the World Wide Web environment, also called simply "The Web." Other Internet resources exist for transferring information, such as File Transfer Protocol (FTP) and Gopher, but have not achieved the popularity of the Web. In the Web environment, servers and clients affect data transaction using the Hypertext Transfer Protocol (HTTP), a known protocol for handling the transfer of various data files (e.g., text, still graphic images, audio, motion video, etc.). Information is formatted for presentation to users by standard page description language, the Hypertext Markup Language (HTML). In addition to basic presentation formatting, HTML allows developers to specify "links" to other web resources identified by a Uniform Resource Locator (URL). The URL is a special syntax identifier defining a communications path to specific information. Each logical block of information accessible to a client, called a "page" or a "Web page," is identified by a URL. The URL provides a universal, consistent method for finding and accessing this information, not necessarily for the user, but mostly for the user's Web "browser." A browser is a program capable of submitting a request for information identified by a URL at the client machine. Retrieval of information on the Web is generally accomplished with an HTML compatible browser. The Internet also is widely used to transfer applications to users using browsers.

Users exploring the Web are also able to access various services, including directory services and name services. Directory services are distinguished from name services by their ability to search and retrieve named information. LDAP is a Lightweight Directory Access Protocol produced by the Internet Engineering Task Force (IETF). LDAP provides searching capabilities with a well defined description format for delineated access to directory information via an API or URL. The term LDAP refers to both a protocol and an API for accessing directory services. The protocol defines how directory information is stored in key/value pairs and has defined some standard keys (referred to as attributes) for accessing information and for searching across the directory database. To find an LDAP entry the user must specify the distinguished name (DN) which is simply a set of Relative Distinguished Names (RDN).

An RDN component is a set of attribute-value pairs. The prior art assumes monolingual entries but has provision for multi-lingual access through RFC 2596 in which the database is primed with alternate search keys for each language. The present invention enables multi-lingual access through an automation process without any modification of the LDAP database which increases the size of the database and effects the scaleability of searching by adding alternate entries, as in the prior art.

SUMMARY OF THE INVENTION

Accordingly, an object of the present invention is to provide an automation process for using a machine translation function to make an LDAP directory service accessible to multi-lingual queries.

Another object of the invention is to provide a seamless model to facilitate multi-lingual access to an LDAP directory via a URL.

A third object of the invention is to provide multi-lingual accessibility without the need to add additional multi-lingual entries to the LDAP directory.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages Thereof, reference is now made to the following Detailed Description taken in conjunction with the accompanying drawings, in which.

DETAILED DESCRIPTION OF THE INVENTION

Figure 1:
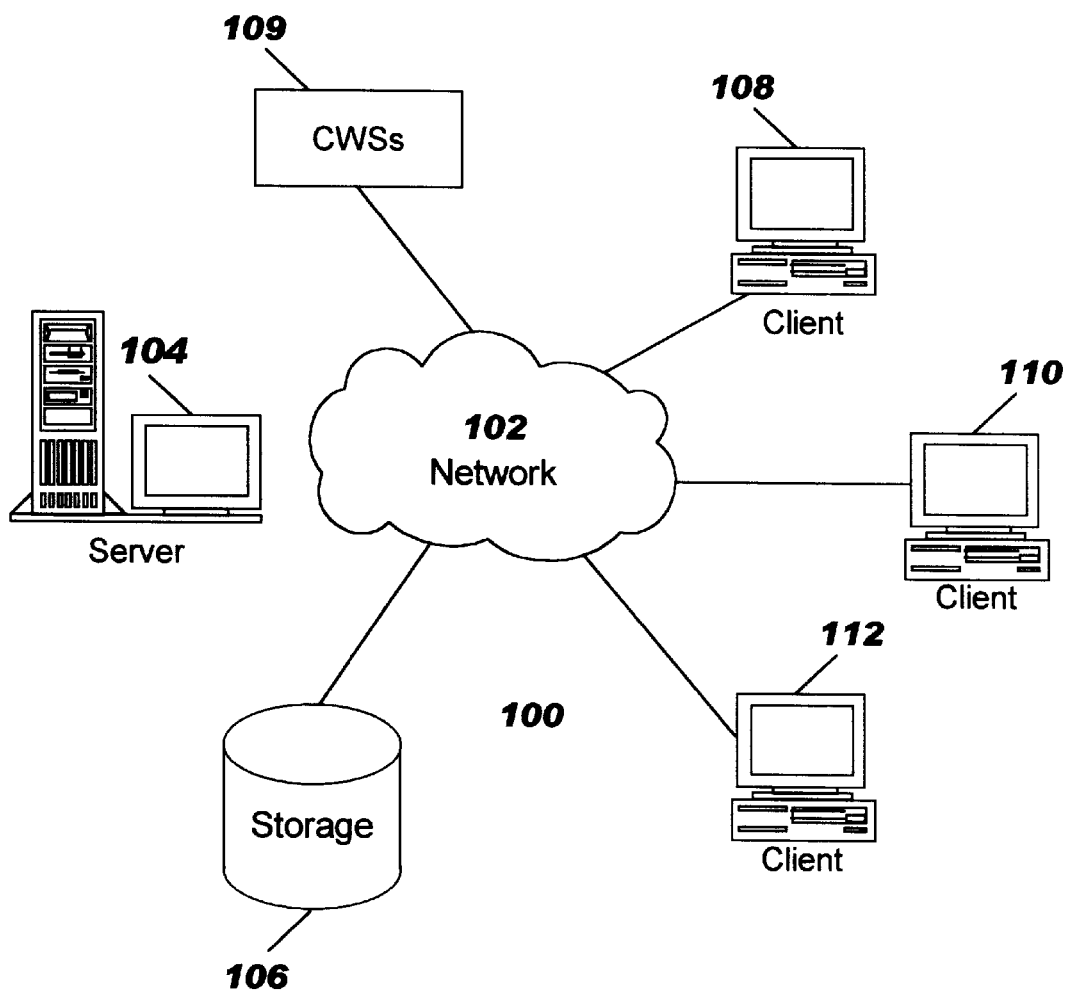
FIG. 1 is a pictorial representation of a distributed data processing system which may be utilized to implement the present invention.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage Unit 106. In addition, a group of cooperating web servers CWSs 109 is connected to network 102. Clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Users located at these clients may, for example, without limitation, access various resources through browsers.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is the backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an Intranet, a local area network (LAN), or a wide area network (WAN). FIG. 1 is intended as an example, and not as an architectural limitation for the processes of the present invention.

Figure 2:
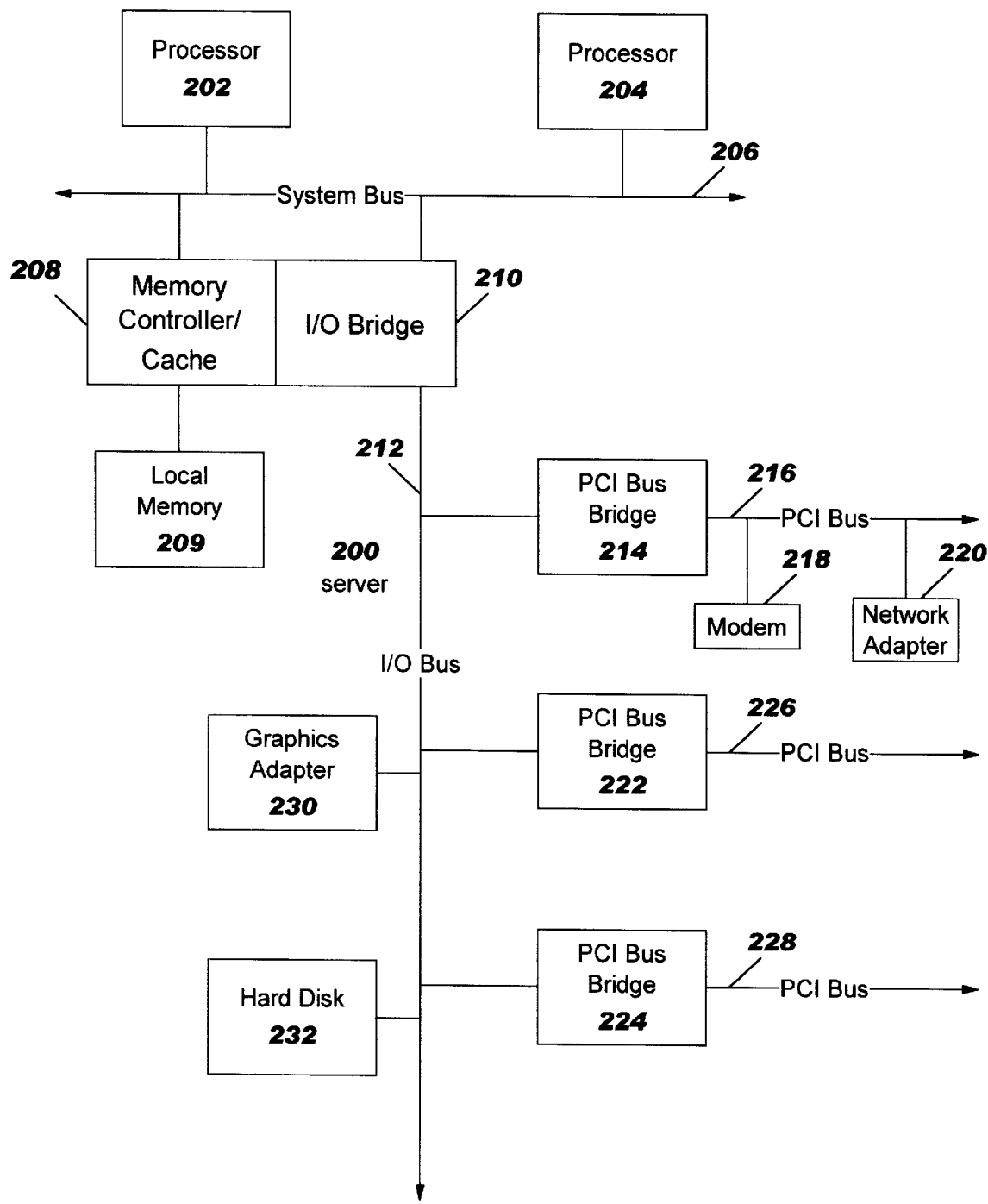
FIG. 2 is a block diagram depicting a data processing system, which may be implemented as a server in accordance with the present invention.

Referring to FIG. 2, a block diagram depicts a data processing system, which may be implemented as a server, such as server 104 in FIG. 1, in accordance with the present invention. Data processing system 200 maybe a symmetric multiprocessor (SMP) system including a plurality of processors 202 and 204 connected to system bus 206. Alternatively, a single processor system may be employed. Also connected to system bus 206 is memory controller/cache 280, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides. an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like, also may be used in addition to or in place of the hardware detected. The depicted example is not meant to imply architectural limitations with respect to the present invention.

The data processing system depicted in FIG. 2 maybe, for example, an IBM RISC/System 6000 system, a product of International Business Machines Corp. in Armonk, N.Y., running the Advanced Interactive Executive (AIX) operating system.

Figure 3:
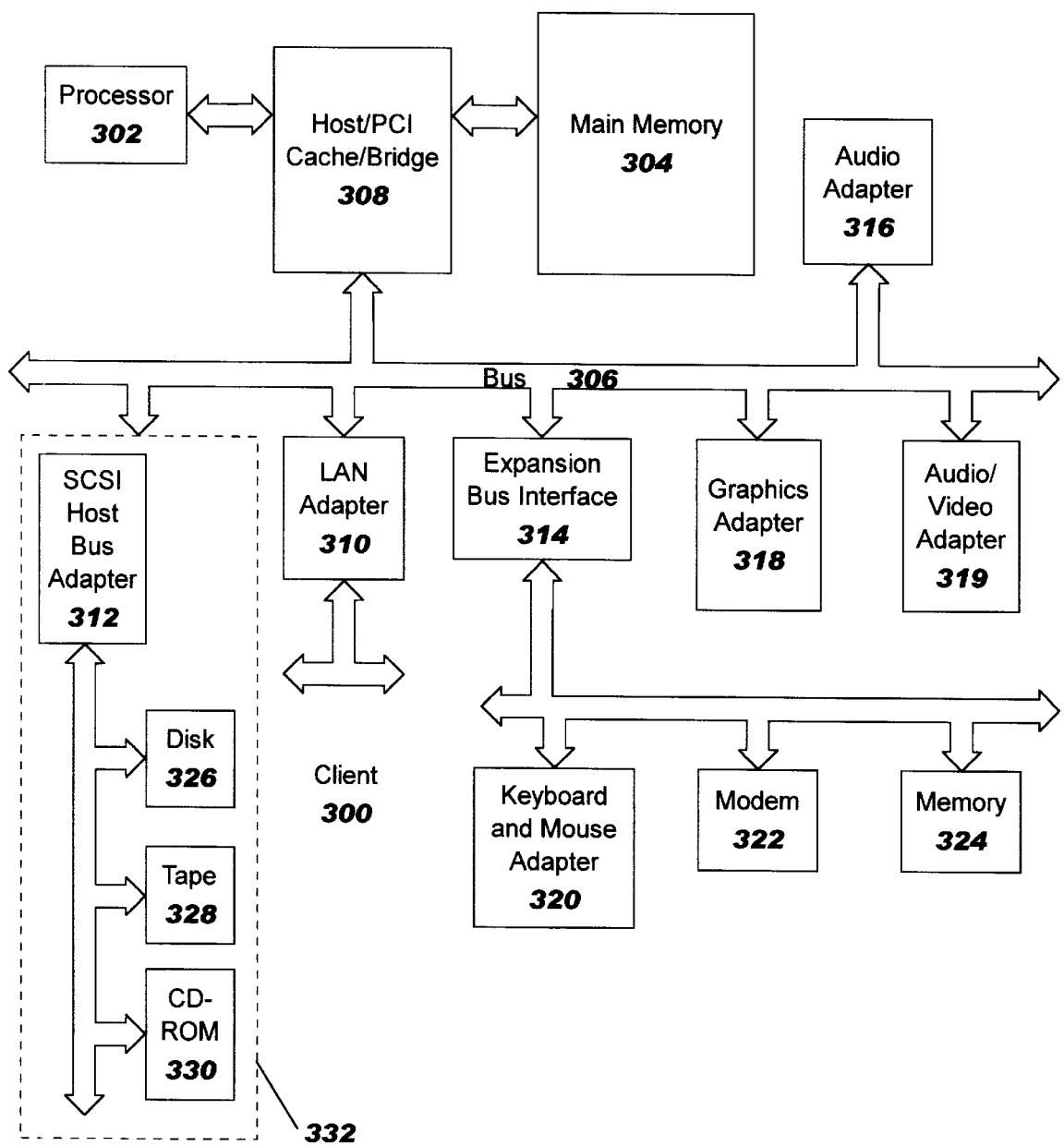
FIG. 3 is a block diagram illustrating a data processing system in which the present invention may be implemented.

With reference now FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, trademark of International Business Machines Corporation. An object oriented programming system, such as Java, a trademark of Sun Microsystems, Inc., may run in conjunction with the operating system and provides calls to the operating system from the Java programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user generated data.

The depicted example in FIG. 3 and above-described examples are not meant to imply architectural limitations with respect to the present invention. Although FIGS. 1–3 provide examples of configurations of computer systems on which the present invention may execute, the following background information may provide a context for understanding the overall computing environment in which the present invention may be used.

Software program code which employs the present invention is typically stored in the memory of a storage device 232 of a stand-alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

The present invention will now be described in detail with reference to FIGS. 4 and 5. LDAP directories are language centric, and the most common language is English. A client must use the language of the LDAP directory to form access queries. For example, to search for the Organizational Unit of "Accounting" in an LDAP directory which is English centric the LDAP URL is shown below:

ldap://w3.1dap.ibm.com/ou=Accounting,o=IBM,c=US

A German speaking person would naturally enter:

ldap://w3.1dap.ibm.com/ou=Buchführung,o=IBM,c=US to search for the Organization Unit of "Accounting". The English language centric LDAP server will not find this entry although the meaning of the word "Accounting" in English is the same as "Buchführung" in German.

Figure 4:
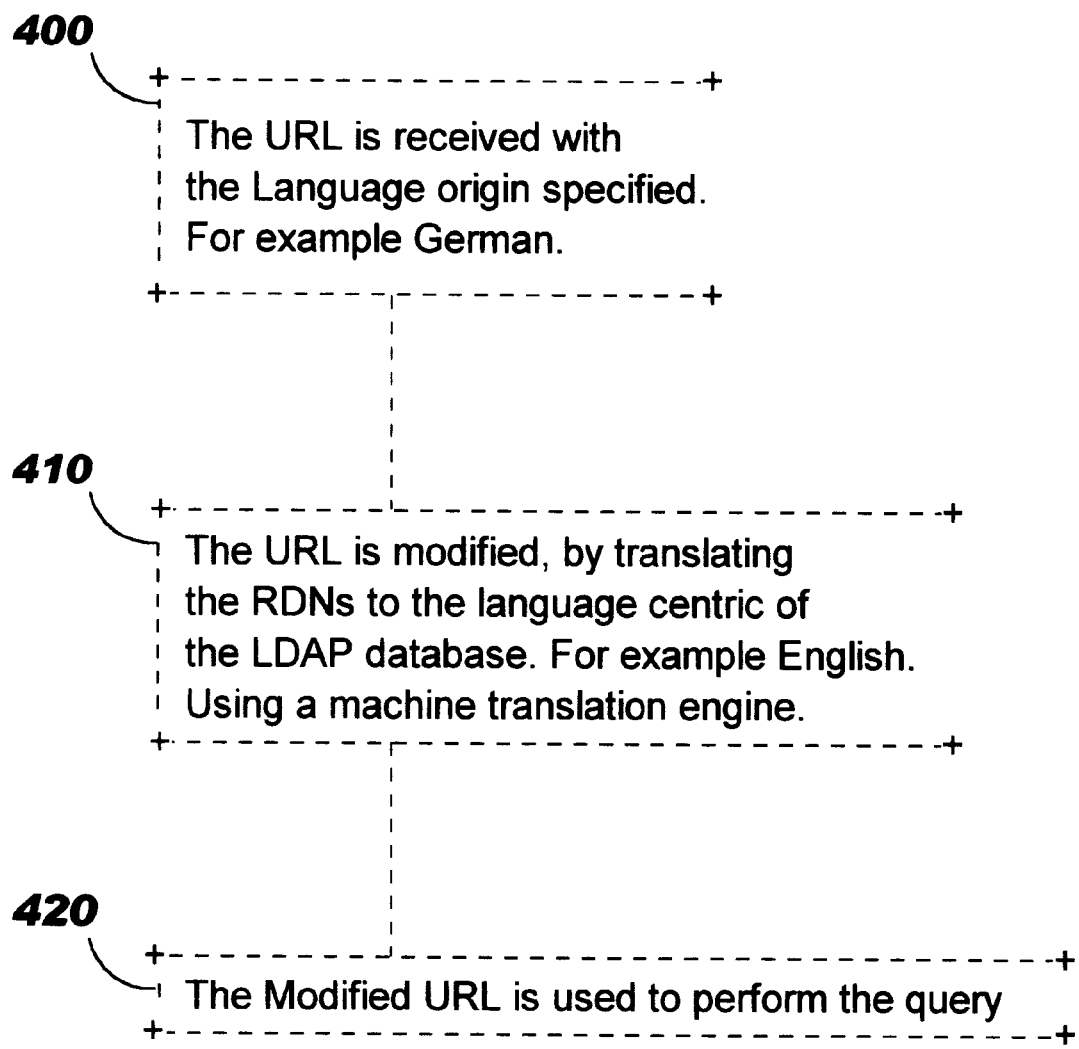
FIG. 4 is a flowchart illustrating the present invention.

Referring now to the flowchart of FIG. 4, at 400 a URL is received with the origin language, in this case, German. At 410 the URL is translated using a Machine Translation engine by translating the RDNs to the language centric (English) of the LDAP database. The modified URL at 420 (now in English) is then used to perform the query for the LDAP database. Implementation of the present invention does not require that the LDAP server perform the Machine Translation of the URL. At present the LDAP protocol does not support an origin Language specification as part of receiving the URL for a query.

Figure 5:
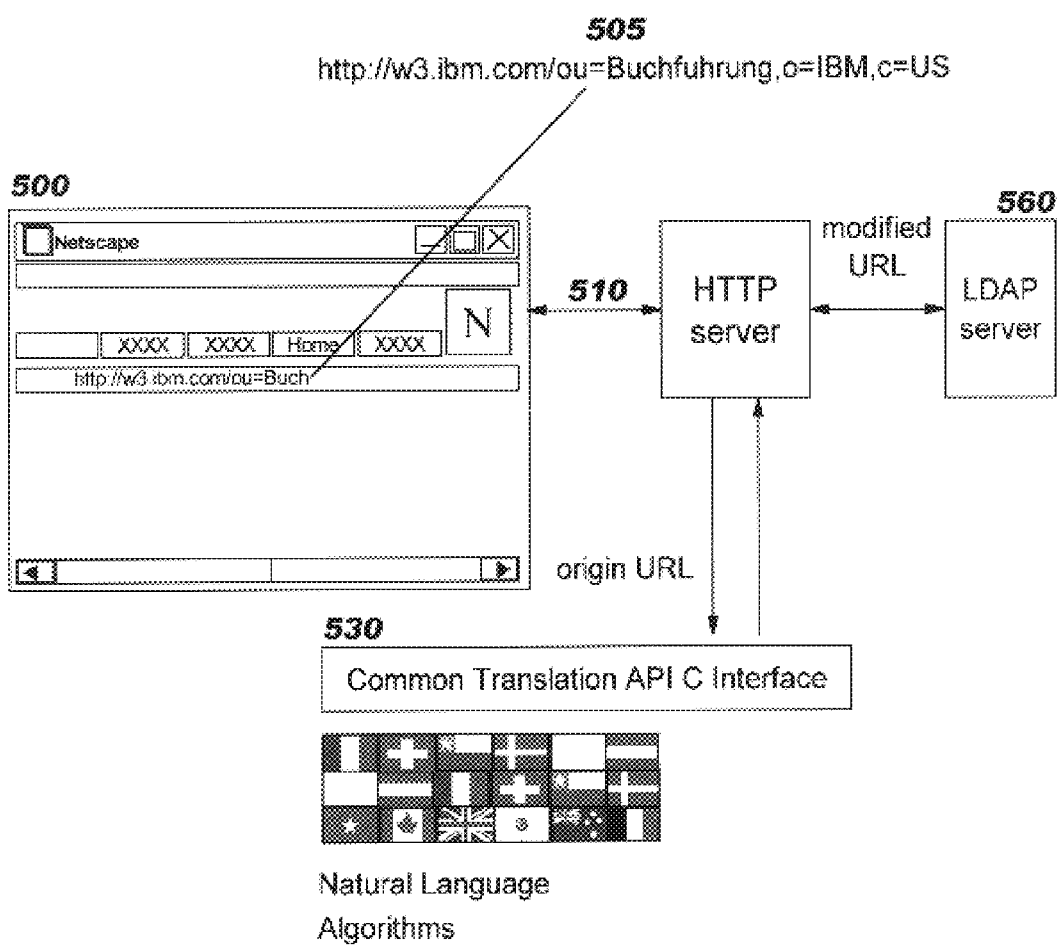
FIG. 5 illustrates an embodiment of the present invention.

Therefore, referring to FIG. 5, an HTTP server is used to proxy the LDAP URL request. Shown at 500 is a browser in which the client has set the preferences language settings, for example, to German. At 505 an LDAP HTTP URL is specified from the browser:

http://w3.ibm.com/ou=Buchführung,o=IBM,c=US

The HTTP protocol provides an HTTP header which indicates the preference language options set by a user's browser. This information is sent to any HTTP server as part of the browser request for a web page. The LDAP protocol does not currently provide a language preference delivery as part of the protocol, but this can be facilitated by an HTTP to LDAP gateway. At 510 the HTTP URL is sent to an HTTP server. This URL is then sent to a Machine Translation engine at 530 (such as, for example, the machine translation engine found in IBM WebSphere Application Server (IBM and WebSphere are trademarks of the IBM Corp.)) which translates the URL and returns it to the HTTP server at 510 which then contacts the LDAP server at 560 with the modified URL. The process is then complete. The LDAP server has been given the adjusted query translated from the user's specified language preference of German to the English centric language of the LDAP database. The LDAP server 560 returns the query response to the HTTP server 510 and then to the browser 500. It is to be understood that, if necessary, the response may also be translated using a process similar to translation of the query, prior to returning the response to the user.

There currently exists a gateway for HTTP to LDAP (as shown in FIG. 5 at 510). A free HTTP to LDAP gateway can be obtained at http://www.tu.chemnitz.de/~fri/web500gw. Writing this gateway is basic to one who has knowledge in the HTTP field, and it is, therefore, unnecessary to further describe. In the future if LDAP should provide a language preference header as part of the protocol, this would be unnecessary.

Although the present invention has been described with respect to a specific preferred embodiment thereof, various changes and modifications may be suggested to one skilled in the art, and it is intended that the present invention encompass such changes and modifications as fall within the scope of the appended claims.

What we claim is:

1. A method of seamlessly extending search indexing of a uni-lingual directory service to multi-lingual, comprising the steps of:

indicating a user's language preference as a first language;

sending a query in said first language to a uni-lingual directory service which is in a second language different from said first language;

intercepting said query;

translating said query into said second language; and delivering said query as translated to said uni-lingual directory service, wherein said service responds to said query with an appropriate response.

2. The method of claim 1, wherein said step of intercepting said query occurs at a processor collocated with said directory service.

3. The method of claim 1, wherein said step of intercepting said query occurs at an intermediate processor which knows appropriate characteristics of said directory service.

4. The method of claim 3, wherein said intermediate processor comprises a proxy.

5. The method of claim 4, wherein said proxy comprises an HTTP server.

6. The method of claim 1, wherein said step of indicating a user's language preference as a first language comprises selecting a preference in a web browser.

7. The method of claim 1, wherein the query comprises a Hypertext Transport Protocol (HTTP) request containing a universal resource locator specifying a relative distinguished name (RDN), and wherein the step of intercepting said query comprises the step of intercepting the HTTP request and wherein the step of translating said query comprises the steps of:

locating the RDN in the universal resource locator of the HTTP request;

translating the RDN from the first language to the second language; and replacing the RDN in the universal resource locator of the HTTP with the translated RDN; and wherein the step of delivering said query comprises the step of forwarding the HTTP request with the replaced RDN.

8. The method of claim 1, wherein the step of translating said query into said second language further comprises the step of translating the query into the second language based on the language of the uni-lingual directory service and independent of user input to translate the intercepted query.

9. A system for seamlessly extending search indexing of a uni-lingual directory service to multi-lingual, comprising:

means for indicating a user's language preference as a first language;

means for sending a query in said first language to a uni-lingual directory service which is in a second language different from said first language;

means for intercepting said query;

means for translating said query into said second language; and means for sending said query as translated to said uni-lingual directory service, wherein said service responds to said query with an appropriate response.

10. The system of claim 9, wherein said means for intercepting said query comprises a processor collocated with said directory service.

11. The system of claim 9, wherein said means for intercepting said query comprises an intermediate processor which knows appropriate characteristics of said directory service.

12. The system of claim 11, wherein said intermediate processor comprises a proxy.

13. The system of claim 12, wherein said proxy comprises an HTTP server.

14. The system of claim 9, wherein said means for indicating a user's language preference as a first language comprises means for selecting a preference in a web browser.

15. The system of claim 9, wherein the query comprises a Hypertext Transport Protocol (HTTP) request containing a universal resource locator specifying a relative distinguished name (RDN), and wherein the means for intercepting said query further comprises means for intercepting the HTTP request and wherein the means for translating said query further comprises:

means for locating the RDN in the universal resource locator of the HTTP request;

means for translating the RDN from the first language to the second language; and means for replacing the RDN in the universal resource locator of the HTTP with the translated RDN; and wherein the means for sending said query further comprises means for forwarding the HTTP request with the replaced RDN.

16. The system of claim 9, wherein the means for translating said query into said second language comprises means for translating the query into the second language based on the language of the uni-lingual directory service and independent of user input to translate the intercepted query.

17. A computer program product recorded on computer readable medium for seamlessly extending search indexing of a uni-lingual directory service to multi-lingual, comprising:

computer readable means for indicating a user's language preference as a first language;

computer readable means for sending a query in said first language to a uni-lingual directory service which is in a second language different from said first language;

computer readable means for intercepting said query;

computer readable means for translating said query into said second language; and computer readable means for sending said query as translated to said uni-lingual directory service, wherein said service responds to said query with an appropriate response.

18. The program product of claim 17, wherein said computer readable means for intercepting said query includes a processor collocated with said directory service.

19. The program product of claim 17, wherein said computer readable means for intercepting said query includes an intermediate processor which knows appropriate characteristics of said directory service.

20. The program product of claim 19, wherein said intermediate processor comprises a proxy.

21. The program product of claim 20, wherein said proxy comprises an HTTP server.

22. The program product of claim 17, wherein said computer readable means for indicating a user's language preference as a first language comprises computer readable means for selecting a preference in a web browser.

23. The computer program product of claim 17, wherein the query comprised a Hypertext Transport Protocol (HTTP) request containing a universal resources locator specifying a relative distinguished name (RDN), and wherein the computer readable means for intercepting said query further comprised computer readable means for intercepting the HTTP request and wherein the computer readable means for translating said query further comprises:

computer readable means for locating the RDN in the universal resource locator of the HTTP request;

computer readable means for translating the RDN from the first language to the second language; and computer readable means for replacing the RDN in the universal resource locator of the HTTP with the translated RDN; and wherein the computer readable means for sending said query further comprises computer readable means for forwarding the HTTP request with the replaced RDN.

24. A computer program product according to claim 17, wherein the computer readable means for translating said query into said second language further comprised computer readable means for translating said query into said second language based on the language of the uni-lingual directory service and independent of user input to translate the intercepted query.

* * * * *